July 2, 1968

A. E. ROBINSON, JR 3,391,056

RESIN-COATED FIBROUS SHEET MATERIAL AND
MEMBERS PREPARED THEREFROM

Filed Dec. 2, 1964

ANDERSON E. ROBINSON, JR.
*INVENTOR.*

BY *Ernest G. Peterson*

AGENT

United States Patent Office 3,391,056
Patented July 2, 1968

3,391,056
RESIN-COATED FIBROUS SHEET MATERIAL
AND MEMBERS PREPARED THEREFROM
Anderson E. Robinson, Jr., Wilmington, Del., assignor to Hercules Incorporated, a corporation of Delaware
Filed Dec. 2, 1964, Ser. No. 415,253
5 Claims. (Cl. 161—232)

ABSTRACT OF THE DISCLOSURE

Fibrous sheet material is coated on at least one surface with certain thermoplastic polyester resins. Exemplary of the resins is that made by melt polymerization of reactants consisting essentially of ethylene glycol and an acid material of which about 25–40 mole percent is dimethyl hexahydroterephthalate and about 75–60 mole percent is dimethyl terephthalate.

---

This invention relates to resin-coated fibrous sheet material.

In particular, this invention relates to fibrous sheet material such as paper having an adherent coating on at least one surface thereof of a specific thermoplastic polyester resin.

This invention relates also to members, particularly laminated members, prepared from the resin-coated fibrous sheet material.

In laminations to itself and to other base materials, the field of end uses of the resin-coated fibrous sheet material of this invention is large. The resin-coated fibrous sheet material of this invention has particular utility as a protective and/or decorative overlay for such base members as wood, metal, and the like. The applied overlay is tough and hard, and it has good resistance to heat.

For a complete understanding of this invention, reference is made to the following detailed description and drawing, in which.

Figure 1:
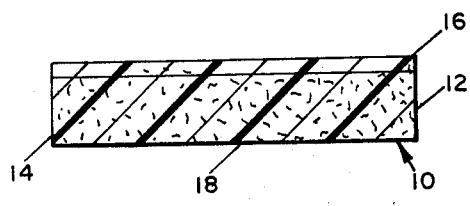
FIG. 1 is a view in cross-section of resin-coated and impregnated fibrous sheet material.

In accordance with this invention, at least one surface of fibrous sheet material such as a paper sheet is provided with an adherent, relatively thin, non-tacky coating or layer of a specific thermoplastic polyester resin to be detailed more fully hereinafter. The applied resin coating will have a thickness of from 0.25 mil to 10 mils and preferably from about 1 mil to 5 mils.

The fibrous sheet material can be resin coated on just one surface or, if desired, on both surfaces. About 20 pounds of resin are required to provide a one mil thick layer or coating on 3000 square feet of fibrous sheet material surface and an additional 20 pounds for each additional mil of coating. Thus, for example, 5 pounds of resin will provide a 0.25 mil thick coating on 3000 square feet of sheet material surface, and 100 pounds of resin will provide a 5 mil thick coating on 3000 square feet of sheet material surface.

The fibrous sheet can be substantially completely impregnated with the resin if desired. Surface coating methods will usually result in slight penetration of the resin in the surface of the fibrous sheet.

The polyester resin-coated fibrous sheet material of this invention has particular utility as a protective and/or decorative overlay for base members such as wood, metal, and the like.

Fibrous sheet material coated on one surface only with the polyester resin can be bonded to base members by means of an adhesive. The uncoated surface of the fibrous sheet is adhesively bonded to a surface of the base member, and the resin-coated surface is exposed. Suitable adhesives include the known thermosettable resinous adhesives such as the epoxy resins, the silicone resins, the phenolic resins, and the like; and the known thermoplastic resinous adhesives such as poly(vinyl acetate), poly(vinyl alcohol), and the like. A hot melt of the polyester resin of this invention can be used as an adhesive for this purpose if desired. Particularly suitable adhesives are the known rubber base laminating adhesives.

Fibrous sheet material coated on both surfaces with the polyester resin can be easily and readily heat sealed or bonded to a surface of a base member. The resin-coated fibrous sheet is placed on a base member and in contact with a surface thereof to provide an assembly which is subsequently heated, preferably with the application of pressure, to a temperature sufficient to fuse the resin layer contacting the base member to provide, upon cooling, a highly satisfactory bond between the base member and the resin-coated fibrous sheet.

The thermoplastic polyester resin employed in this invention is capable of existing in an amorphous state and in a crystalline state. When the polyester resin is used as the bonding adhesive in preparing laminated members, that is, when both surfaces of the fibrous sheet material are coated with the resin, it is recommended that the resin be in the amorphous state in order to take advantage of the lower processing temperatures characteristic of the amorphous state. When desired, the resin is converted to the crystalline state by controlled heat treatment. In its crystalline state, the polyester resin is tough and hard and can withstand relatively high temperatures.

The fibrous sheet material employed in this invention can be woven or non-woven and can be prepared from natural fibers, man-made fibers, and mixtures thereof. Examples of natural fibers include cotton fibers, silk fibers, wool fibers, and asbestos fibers. Examples of man-made fibers include nylon fibers, polyester fibers, and glass fibers. Specific examples of fibrous sheet material include cellulosic paper sheet material such as kraft paper and α-cellulose paper, cotton duck, glass cloth, nylon cloth, and asbestos paper.

The sheet can have, if desired, a design imprinted thereon such, for example, as a wood grain design, or the sheet can be pigmented throughout or dyed. Pigmented sheets with designs imprinted thereon can be employed also. The thickness of the fibrous sheet material will usually be of the order of from about 1 mil to 50 mils and preferably from about 2 mils to 20 mils. Thinner or thicker sheets can be employed if desired.

As above set forth, the particular thermoplastic polyester resin employed in this invention can exist either in an amorphous state or in a stable crystalline state, depending on processing conditions. The amorphous state is characterized by a relatively low softening point of from about 63° C. to 70° C., and the crystalline state, by a relatively high melting point of from about 181° C. to 214.5° C. (birefringent crystalline melting point).

Converison from the amorphous state to the crystalline state is accomplished by heat treatment at a temperature intermediate the amorphous softening point and the crystalline melting poitn for a period of time sufficient to convert the resin to the crystalline state. The resin is softened sufficiently at this temperature to cause it to adhere strongly to a member with which it is in contact.

The polyester resin can be applied to the fibrous sheet material in the form of a hot melt or in the form of a solution thereof in a suitable solvent such as tetrachloroethane, methylene chloride, and ethylene dichloride. Mixtures of solvents can be used if desired. In the form of a hot melt, the resin can be applied by known coating methods such as extrusion coating, curtain coating, roll coating, and the like. Application of a resin solution can be made by such well-known methods as brush coating, dip coating, spray coating, roll coating, and the like, followed by solvent removal. As above set forth, one or both surfaces of the fibrous sheet material can be coated with a resin layer, and the fibrous sheet material can be partially or substantially completely impregnated with the resin.

If desired, the fibrous sheet material can be sandwiched between two preformed sheets of the polyester resin and subsequently subjected to heat and pressure whereby the sheet is provided with an adherent resin layer or coating on both surfaces thereof. As above set forth, it is preferred that the polyester resin of which the composite sheet is initially comprised be in the amorphous state; hence, if the latter process is employed, a time-temperature relationship is adopted that will avoid conversion of the polyester to the crystalline state.

The polyester resins employed in this invention are derived by reacting, under polyester-forming conditions well known in the art, a glycol, such as ethylene glycol, terephthalic acid, and hexahydroterephthalic acid.

The relative amounts of terephthalic acid and hexahydroterephthalic acid to be used are critical. It is necessary that the hexahydroterephthalic acid comprise at least about 25 mole percent and not more than about 40 mole percent of the total acid component of the final polymer. The balance of the acid component of the final polymer, from 75 to 60 mole percent, will be the terephthalic acid. The acids will be present in the final polymer in the same ratio as they were present in the initial reactants provided an excess of glycol is used. Thus, the amount of glycol used in the initial reaction mixture will be in excess of one mole, and preferably from about 1.8 to 2.2 moles per mole of acid component, the acid component consisting of from 25 to 40 mole percent of hexahydroterephthalic acid and from 75 to 60 mole percent of terephthalic acid. It is to be understood that the ester-forming derivatives of these acids can be used in place of, and are the full equivalents of, the above acids as is generally the case in the manufacture of linear polyesters.

Resins derived from less than about 25 mole percent of hexahydroterephthalic acid and more than about 40 mole percent of hexahydroterephthalic acid do not possess the highly satisfactory fabrication properties of the resin employed in this invention. Those polyester resins comprised of less than about 25 mole percent of hexahydroterephthalic acid crystallize too readily, and those comprised of more than about 40 mole percent of hexahydroterephthalic acid crystallize too slowly to be of any practical use in this invention.

In preparing the polyester resins of this invention, it is preferred to use the lower dialkyl esters of the above acids as the initial reactants such, for example, as dimethylterephthalate, dimethylhexahydroterephthalate, diethylterephthalate, and diethylhexahydroterephthalate. Thus, an ester interchange reaction between the glycol and the dialkyl esters of the acids is carried out, preferably in the presence of a suitable catalyst, and the alcohol reaction product is distilled out of the reaction mixture, thereby forming the corresponding glycol phthalates. Subsequently, the product of the ester interchange is heated at elevated temperatures and at reduced pressures to produce a high molecular weight polymer having a specific viscosity of at least about 0.4, and preferably at least about 0.75, as measured at 25° C. on a 1% solution of the polyester resin in a 60:40 mixture by weight of phenol and tetrachloroethane. Thus, when ethylene glycol is employed as the glycol reactant, the products are composed of linear molecules of high average molecular weight in which two kinds of repeating units, ethylene terephthalate and ethylene hexahydroterephthalate, are distributed at random along the polymer chain, from 25 to 40 mole percent of the units being ethylene hexahydroterephthalate units and from 75 to 60 mole percent of the units being ethylene terephthalate units.

The polyetser resins can be, and preferably are, derived by the ester interchange and polymerization process disclosed and described in U.S. Patent 3,057,828, reference to which is hereby made. Using this method, the ester interchange reaction is carried out by heating the glycol with a mixture of dimethylhexahydroterephthalate and dimethylterephthalate in the presence of a catalyst such as cadmium antimonite, tin antimonite, lead antimonite, magnesium antimonite, manganese antimonite, and mixtures thereof. The resulting glycol terephthalate—glycol hexahydroterephthalate is polymerized by splitting off glycol under reduced pressure at elevated temperature in the presence of the catalyst used in the ester interchange reaction.

Glycols that can be used in preparing the polyester resins of this invention include the glycols having the formula $HO(CH_2)_nOH$ wherein $n$ is a whole number of from 2 through 10 such, for example, as 1,2-ethanediol, 1,3-propanediol, 1,4-butanediol, 1,6-hexanediol, 1,8-octanediol, and 1,10-decanediol. Mixtures of two or more glycols can be employed if desired.

The following examples, summarized in Table I, are illustrative of the preparation of the polyester resins employed in this invention. All parts are by weight unless otherwise specified. In the examples, DMHHT is used to designate dimethylhexahydroterephthalate, DMT is used to designate dimethylterephthalate, and EG is used to designate ethylene glycol.

The polyester resins of the examples were prepared by polymerizing, under melt polymerization conditions, the reactants in the amounts set forth in Table I. The reactants, in the amounts indicated in Table I, were placed in a reaction vessel equipped with a heater, a motor-driven stirrer, and a still head. The resulting mixture was melted and then, with constant agitation, heated at temperatures, programmed upward from 180° C. to 230° C. over a period of time (from about 9 to 12 hours) required to remove substantially all the methanol reaction product from the reaction vessel. The prepolymer thus formed was transferred to a stainless steel autoclave equiped with heater, motor-driven stirrer, and vacuum line, and then preheated to a temperature of about 150° C. A 30 millimeters of mercury vacuum was established, and, with constant agitation, the prepolymer was heated for 3 hours at temperatures programmed upward from 150° C. to 285° C. under pressure programmed downward from 30 millimeters of mercury to 1 millimeter of mercury. After reaching the temperature of 285° C., the reaction mass was maintained at this temperature for about 1¾ hours, during which time the pressure was reduced from 1 millimeter of mercury to 0.5 millimeter of mercury. The molten polyester resin thus formed was discharged from the autoclave through a water quench, chopped into relatively small segments, dried for 16 hours at 60° C. in vacuum, and then packaged hermetically. The polyester resin thus prepared was in the amorphous state.

TABLE I

| Example No. | 1 | 2 | 3 | 4 |
| --- | --- | --- | --- | --- |
| Reactants: | | | | |
| DMHHT: | | | | |
| Parts | 450 | 540 | 630 | 720 |
| Mole percent | 25 | 30 | 35 | 40 |
| DMT: | | | | |
| Parts | 1,309.5 | 1,222.2 | 1,134.9 | 1,047.6 |
| Mole percent | 75 | 70 | 65 | 60 |
| EG, parts | 1,004.4 | 1,004.4 | 1,004.4 | 1,004.4 |
| Catalyst, Pb(SbO$_2$)$_2$, part | .261 | .261 | .261 | .261 |
| Product yield, parts | 1,672 | 1,710 | 1,728 | 1,720 |
| Specific viscosity | 0.78 | 0.56 | 0.82 | 0.52 |
| Amorphous softening point, ° C | 70 | 66 | 64 | 63 |
| Birefringent crystalline melting point, ° C | 214.5 | 207 | 192 | 181 |
| 2nd order transition temp., ° C | 53 | 49 | 48 | 44 |
| Hardness, Rockwell R-15 | 108 | 104 | 106 | 102 |

The crystallization behavior of the polyester resins of the examples is shown by the data set forth in Table II below. The data were obtained by the following procedure. Film strips, 0.25 inch by 3 mils by 12 inches, were prepared from crystallizable polyester resins of the examples. These films strips were laid on a special hot plate having a controlled, continuous temperature profile of 60° C. to 260° C., that is, the hot plate temperatures, which remained substantially constant for a given zone and differed from zone to zone, progressed from 60° C. at one end of the hot plate to 260° C. at the other end. All films strips were initially in the amorphous (transparent) state. As a function of residence time on the hot plate, crystal growth, as evidenced by a change of transparency in the film of a cloudy or translucent state, was observed for each film. Crystal growth of a particular polyester resin with time is denoted by the increasing breadth of the cloudy or translucent area in terms of its progessive upper and lower temperature limits.

Referring to Table II, the fastest crystallization temperature for a specific resin is indicated as the mid-temperature of the crystal zone at its earliest incidence. In Table II, NVCF is used to designate "no visible crystal formation." Thus, for example, in the polyester of Example 1, visible crystal formation occurred after 5 minutes, and the temperature limits defining the visible crystal zone at that instance were 140° C. and 145° C. Thus the fastest crystallization temperature of the Example 1 resin is about 142.5° C.

TABLE II.—CRYSTAL GROWTH OF CRYSTALLIZABLE POLYESTERS OF TABLE I

| Polyester of | Temperature Zone of Crystal Formation (°C.) | | | |
| --- | --- | --- | --- | --- |
| | Example 1 | Example 2 | Example 3 | Example 4 |
| Time: | | | | |
| Start | NVCF | NVCF | NVCF | NVCF |
| 2 minutes | NVCF | 139–148 | NVCF | NVCF |
| 5 minutes | 140–145 | 126–160 | 130–134 | 115–121 |
| 10 minutes | 132–155 | 109–169 | 121–148 | 96–137 |
| 15 minutes | 121–175 | 97–176 | 113–155 | 92–144 |
| 20 minutes | 113–184 | 95–182 | 108–160 | 90–150 |
| 30 minutes | 106–190 | 90–190 | 105–163 | 86–155 |
| 60 minutes | 98–195 | 88–194 | 94–170 | 83–159 |
| 2 hours | 95–206 | 87–197 | 90–187 | 79–160 |
| 4 hours | 92–207 | 82–201 | 85–190 | 73–162 |

The following examples are illustrative of this invention. All parts and percentages are by weight unless otherwise indicated. In the examples the amount of resin applied to the fibrous sheet is referred to as "resin add-on" and is set forth in pounds of resin per 3000 square feet of sheet surface.

Example 5

A 5 mil thick sheet of white sulfite saturating paper (30 lbs. per 3000 sq. ft.) was sandwiched between two amorphous polyester sheets prepared from the polyester resin of Example 3. Each polyester sheet was two mils thick. The resulting assembly was consolidated under a pressure of about 50 p.s.i. at a temperature of 150° C. for one minute into a composite sheet which was optically clear. The amount of resin add-on was 80 pounds per 3000 square feet of paper. The composite sheet was placed on a ¼-inch thick base of 3-ply maple veneer board to provide an assembly which was placed in a press and consolidated into a unitary laminated article under a pressure of about 100 p.s.i. at a temperature of about 135° C. for about 15 minutes. The grain of the maple veneer was clearly visible through the applied overlay. The polyester resin was in the crystalline state after the heat treatment. The tensile bond strength of the applied overlay was at least 156 p.s.i. as the laminate failed in the maple veneer board at that stress and there was no failure at the bond. The Sward hardness at the exposed surface of the applied sheet was 54, and the 60° specular gloss thereof was 79% as determined by the test method of ASTM D523. The softening point of the heat-treated polyester resin was 160° C.

Example 6

A sheet of red pigmented sulfite saturating paper (100 lbs. per 3000 sq. ft.) having a thickness of about 10 mils is sandwiched between two polyester sheets prepared from the polyester of Example 1. Each polyester sheet is 2 mils thick, and the resin is in the amorphous state. The sandwich is placed on a steel panel, and the resulting assembly is consolidated into a unitary laminated member under a pressure of about 100 p.s.i. at a temperature of 150° C. for 8 minutes. The tensile bond strength of the applied decorative layer is about 140 p.s.i. The Sward hardness of the decorative layer is 50 and the specular gloss is 79% (ASTM D523). The polyester resin component of the applied decorative layer is in the crystalline state, and it has a softening point of about 150° C.

Example 7

A composite sheet is prepared by extrusion coating both surfaces of sulfite saturating paper (100 lbs. basis weight) having a wood grain design printed thereon with the polyester of Example 3. The coating on each side of the paper has a thickness of about 2 mils, and the resin add-on is 80 pounds per 3000 square feet of paper. The prepared composite sheet is placed on a ¼-inch thick hardboard base, and the resulting assembly is consolidated into a unitary decorative laminate under a pressure of about 100 p.s.i. at a temperature of 150° C. for 10 minutes. The unitary laminated member has the appearance of varnished wood. The tensile bond strength of the applied decorative layer is at least 86 p.s.i. as the laminated member fails first in the fiber of the hardboard. The Sward hardness of the decorative layer is 60, and its specular gloss, 80% (ASTM D523).

Example 8

An assembly is prepared by superimposing the following members one upon the other in the order indicated.

(1) 2-mil thick sheet of Example 3 polyester (amorphous state)
(2) 10-mil thick sheet of sulfite paper imprinted with wood grain (100 lbs. basis weight)
(3) 2-mil thick sheet of Example 3 polyester (amorphous state)
(4) 25-mil thick sheet of kraft board (90 lbs. per 1000 sq. ft.)
(5) 2-mil thick sheet of Example 3 polyester (amorphous state)
(6) 1-inch thick kraft paper honeycomb structure
(7) 2-mil thick sheet of Example 3 polyester (amorphous state)
(8) 25-mil thick sheet of kraft board (90 lbs. per 1000 sq. ft.)
(9) 2-mil thick sheet of Example 3 polyester (amorphous state)
(10) 10-mil thick sheet of sulfite paper imprinted with wood grain (100 lbs. basis weight)
(11) 2-mil thick sheet of Example 3 polyester (amorphous state)

The assembly is consolidated into a unitary structure under a pressure of about 25 p.s.i. at a temperature of 150° C. for 15 minutes. The unitary structure is a double-faced decorative panel showing simulated wood grain. The structure has a weight of about 7 pounds per cubic foot and is comprised of, by weight, about 90% paper and 10% polyester (crystalline). Sward hardness of both surfaces is between 50 and 54. Compressive strength of the structure in three directions is between 45 and 50 p.s.i. The unitary structure of this example is particularly useful as a lightweight structural material and can be employed as a room divider and the like.

Example 9

A sheet of unbleached kraft paper having a thickness of about 9 mils is sandwiched between two 3-mil, cast, amorphous sheets prepared from the polyester resin of Example 3 to provide a sandwich which is subsequently consolidated into a composite unitary sheet under a pressure of about 75 p.s.i. at a temperature of 175° C. for 2 minutes. The resin add-on is 120 pounds per 3000 square feet of paper surface. The unitary composite sheet is semi-transparent. Tensile strength of the sheet is 6000 p.s.i. Two additional unitary composite sheets are prepared as above described, and the three sheets are stacked one upon another and combined into a unitary laminated article by subjecting the resulting stack to a pressure of about 100 p.s.i. at a temperature of about 150° C. for a period of about 8 minutes. The flex modulus of the resulting laminate is about 700,000 p.s.i. This laminate can be employed as an electrical grade laminate, in the manufacture of containers, and the like.

Example 10

A 2-mil thick amorphous polyester sheet is prepared from the polyester resin of Example 3 and then placed on a sheet of red pigmented sulfite saturating paper having a thickness of about 10 mils. The assembled sheets are consolidated into a unitary composite sheet under a pressure of about 50 p.s.i. at a temperature of about 150° C. for about one minute. One surface of the paper sheet is devoid of resin, and the other surface carries an adherent polyester layer. The resin add-on is 40 pounds per 3000 square feet of paper. The composite sheet, resin layer exposed, is bonded to a one-half inch thick fiberboard with an epoxy resin adhesive to provide a laminate. The laminate is subsequently heat treated at a temperature of about 60° C. for about 15 minutes to convert the polyester resin to the crystalline state. The exposed resin layer is hard, tough, and has good heat resistance.

The polyester resin-coated fibrous sheet material of this invention can be laminated to such base materials as metal sheets such as aluminum and steel; block plate such as tin plate and steel plate; leather; wood, particularly plywood and composition board; rubber, including natural and synthetic rubber; honeycomb structures prepared from kraft paper, aluminum foil, and the like; cellular structures such as cellular polystyrene and cellular cellulose acetate; woven and non-woven sheets comprised of glass fibers; masonry structures such as cement block or cinder block; glass; and the like.

The fiber-reinforced polyester sheets can be formed into a laminated tubular member by convolutely winding the sheet on a mandrel and subsequently heat treating the formed tube to fuse the resin and to convert the resin to its crystalline state. Such a tubular member can be used as a bobbin barrel in the manufacture of a bobbin for use in the textile industry. In addition, a base can be secured to an end of the tube to provide a container for oils, solvents, chemicals, and other commodities.

Fibrous sheet material coated on both sides with the polyester resin hereinabove described can be heat sealed to itself. Owing to its good heat sealing properties, it can be employed as an adhesive member to bond together two similar or two dissimilar members. Thus, for example, a sheet of kraft paper, resin coated on both sides, can be sandwiched between a steel sheet and a plywood sheet to provide an assembly. The assembly is then subjected to sufficient heat to fuse the resin. Upon cooling there is provided a unitary laminated structure comprised of the steel sheet and the plywood sheet.

Referring to FIG. 1 of the drawing, there is shown composite sheet 10 comprised of fibrous sheet 12 impregnated and coated with polyester resin 14. A relatively thin layer or coating 16 of resin 14 is disposed on a surface of fibrous sheet 12. Surface 18 of composite sheet 10 is substantially devoid of resin 14, and, in employing this composite sheet as a protective overlay for a base member, it is necessary to employ an adhesive such as a rubber base laminating adhesive to bond the composite sheet to the base member. The surface 18 can be coated with the adhesive prior to bonding, or the surface of the base member can be coated with the adhesive prior to bonding. Both surface 18 and the surface of the base member can be coated with bonding adhesive if desired. The resin 14, in this embodiment, can be either in the amorphous state or in the crystalline state. If the resin is in the amorphous state, a heat treatment is applied after formation of the laminate to convert the resin to its crystalline state. In the crystalline state, the exposed resin layer 16 will have good resistance to heat and to abrasion.

While this embodiment shows complete resin impregnation of the fibrous sheet, it is not necessary, for the purposes of this invention, that the sheet be completely resin impregnated. An adherent surface coating of resin will provide a satisfactory member. However, owing to the nature of fibrous sheet material and to the methods employed for providing an adherent surface coating of resin, there will usually be at least slight surface penetration of the resin.

Figure 2:
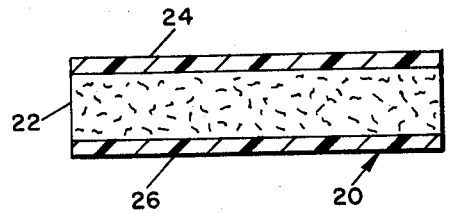
FIG. 2 is a view in cross-section of resin-coated fibrous sheet material.
Figure 3:
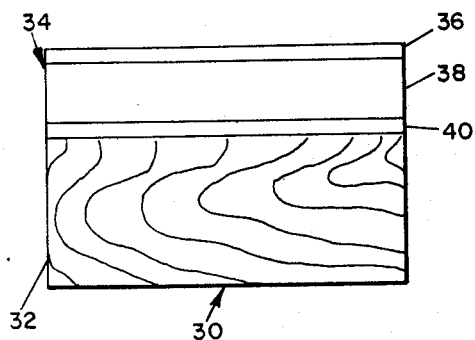
FIG. 3 is an end view of a laminated article.

In FIG. 2 of the drawing, there is shown unitary composite sheet 20, which is comprised of fibrous sheet 22, adherent resin layer 24, and adherent resin layer 26. While this embodiment shows no impregnation of the fibrous sheet, it is to be understood that the fibrous sheet 22 can be partially or substantially completely impregnated with resin to give added strength properties to the fibrous sheet, if desired. As above set forth, owing to the fact that the fibrous sheet material employed in this invention will be of a porous nature, there will usually be at least some penetration of the resin layers into at least the surfaces of the fibrous sheet during the preparation of the composite sheet. In the embodiment shown in FIG. 2 of the drawing, it is preferred that the polyester resin of which the layers 24 and 26 is comprised be in the amorphous state. When placed in contact with a surface of a base member to form a laminate with a protective and/or decorative overlay, relatively low processing temperatures suffice to provide a satisfactory bond at the interface of the base member and the composite sheet. Heat is applied for a period of time sufficient to convert the resin to its crystalline state.

Laminated article 30, which is comprised of base member 32 and protective overlay 34, is prepared by bonding a composite sheet similar to that shown in either FIG. 1 or FIG. 2 of the drawing to the base member. A layer of an adhesive material, such as a rubber base laminating adhesive, is used to bond the FIG. 1 composite sheet to a base member. No additional adhesive layer is required when the FIG. 2 composite sheet is bonded to a base member since one of the resin layers serves this function. Thus, overlay 34 is comprised of surface layer 36 which is the polyester resin employed in this invention, preferably in its crystalline form, fibrous sheet material 38, which may or may not be impregnated with the polyester resin, and adhesive or bonding layer 40. The coating or layer 36 is tough, hard, and has good resistance to abrasion. Fibrous sheet 38 can be pigmented and/or imprinted with the design, such as a wood grain design, in which the overlay 34 serves also as a decorative overlay.

Figure 4:
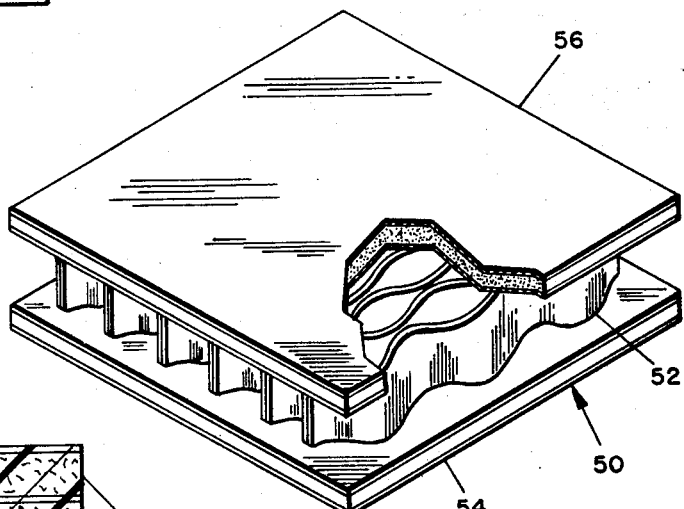
FIG. 4 is a view in perspective of a structural panel with a portion of a facing element broken away.

Referring to FIG. 4 of the drawing, there is shown a structural panel 50 which is comprised of a honeycomb core 52 which can be prepared from any suitable material such, for example, as kraft paper, aluminum foil, and the like. Honeycomb structures and their method of manufacture are well known in the art and form no part of this invention. Applied to either side of the honeycomb core 52 are overlays 54 and 56 which are comprised of a composite sheet of this invention in which the polyester resin component is in the crystalline state. Panels of this type can be employed as room and office dividers.

Figure 5:
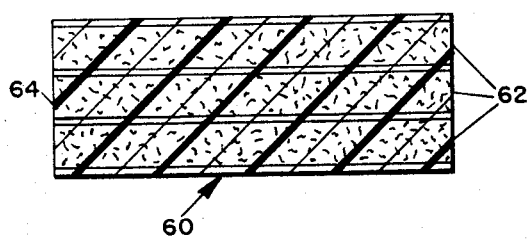
FIG. 5 is a view in cross-section of a laminated article.

FIG. 5 of the drawing shows a laminate 60 comprised of sheets 62 of kraft paper impregnated and bonded together by polyester resin 64 employed in this invention in its crystalline form. Owing to the good dielectric properties of the polyester resin component of the laminate, such laminated structures can be used as electrical grade laminates.

It is to be understood that the above description and drawing are illustrative of this invention and not in limitation thereof.

What I claim and desire to protect by Letters Patent is:

1. As a new article of manufacture, fibrous sheet material coated on at least one surface thereof with a relatively thin layer of a thermoplastic polyester resin having a specific viscosity of at least about 0.4 as measured at 25° C. on a 1% solution of said resin in a 60:40 by weight mixture of phenol and tetrachloroethane, and made by the melt polymerization of reactants consisting essentially of
   (1) acid material of which
      (a) about 25–40 mole percent thereof is selected from the group consisting of hexahydroterephthalic acid and lower dialkyl esters thereof, and
      (b) about 75–60 mole percent thereof is selected from the group consisting of terephthalic acid and lower dialkyl esters thereof,
   (2) a glycol having the formula $HO(CH_2)_nOH$ wherein $n$ is a whole number of from 2 through 10, said glycol being in excess of one mole per mole of said acid material.

2. As a new article of manufacture, fibrous sheet material coated on at least one surface thereof with a relatively thin layer of a thermoplastic polyester resin having a specific viscosity of at least about 0.4 as measured at 25° C. on a 1% solution of said resin in a 60:40 by weight mixture of phenol and tetrachloroethane, and made by the melt polymerization of reactants consisting essentially of
   (1) acid material of which
      (a) about 25–40 mole percent thereof consists essentially of dimethyl hexahydroterephthalate, and
      (b) about 75–60 mole percent thereof consists essentially of dimethyl terephthalate, and
   (2) ethylene glycol.

3. As a new article of manufacture, a decorated sheet of fibrous material coated on at least one surface thereof with a relatively thin substantially impervious layer of a thermoplastic polyester resin having a specific viscosity of at least about 0.4 as measured at 25° C. on a 1% solution of said resin in a 60:40 by weight mixture of phenol and tetrachloroethane, and made by the melt polymerization of reactants consisting essentially of
   (1) acid material of which
      (a) about 25–40 mole percent thereof consists essentially of dimethyl hexahydroterephthalate, and
      (b) about 75–60 mole percent thereof consists essentially of dimethyl terephthalate, and
   (2) ethylene glycol.

4. A decorative composite unitary laminated article comprising a base member and a surface layer comprising a decorated sheet of fibrous material sandwiched between two resin layers of a crystalline thermoplastic polyester resin having a specific viscosity of at least about 0.4 as measured at 25° C. on a 1% solution of said resin in a 60:40 by weight mixture of phenol and tetrachloroethane, and made by the melt polymerization of reactants consisting essentially of
   (1) acid material of which
      (a) about 25–40 mole percent thereof consists essentially of dimethyl hexahydroterephthalate, and
      (b) about 75–60 mole percent thereof consists essentially of dimethyl terephthalate, and
   (2) ethylene glycol,
one of said resin layers being exposed and providing an abrasion resistant exterior surface and the other of said resin layers serving to bond the decorated sheet of fibrous material to the base member.

5. In the method of providing a base member with a decorative abrasion resistant overlay, the steps comprising superimposing on a surface of a base member a decorated sheet of fibrous material coated on both surfaces with a relatively thin layer of a thermoplastic polyester resin having a specific viscosity of at least about 0.4 as measured at 25° C. on a 1% solution of said resin in a 60:40 by weight mixture of phenol and tetrachloroethane, and made by the melt polymerization of reactants consisting essentially of
   (1) acid material of which
      (a) about 25–40 mole percent thereof consists essentially of dimethyl hexahydroterephthalate, and
      (b) about 75–60 mole percent thereof consists essentially of dimethyl terephthalate, and
   (2) ethylene glycol,
said polyester resin being in the amorphous state, to provide an assembly and heating the assembly at a temperature intermediate the amorphous softening point of the resin and the crystalline melting point of the resin for a period of time sufficient to convert the resin to its crystalline state.

References Cited
UNITED STATES PATENTS

| | | | |
|---|---|---|---|
| 2,604,689 | 7/1952 | Hebeler | 161—173 X |
| 2,623,033 | 12/1952 | Snyder | 260—75 |
| 2,961,365 | 11/1960 | Sroog | 156—332 X |
| 2,977,272 | 3/1961 | Pounds | 161—232 X |
| 3,036,913 | 5/1962 | Burg | 156—332 X |
| 3,088,933 | 5/1963 | Ottmann | 161—233 X |

EARL M. BERGERT, *Primary Examiner.*

R. KILLWORTH, *Assistant Examiner.*